(12) United States Patent
Bornes

(10) Patent No.: US 9,580,184 B2
(45) Date of Patent: Feb. 28, 2017

(54) TWIN-ENGINED ROTORCRAFT HAVING A FUEL SUPPLY INSTALLATION FOR A POWER PLANT AUXILIARY POWER UNIT (APU)

(71) Applicant: AIRBUS HELICOPTERS, Marignane (FR)

(72) Inventor: Sylvain Bornes, Coudoux (FR)

(73) Assignee: AIRBUS HELICOPTERS, Marignane (FR)

( * ) Notice: Subject to any disclaimer, the term of this patent is extended or adjusted under 35 U.S.C. 154(b) by 216 days.

(21) Appl. No.: 14/722,365

(22) Filed: May 27, 2015

(65) Prior Publication Data
US 2016/0272338 A1  Sep. 22, 2016

(30) Foreign Application Priority Data
May 28, 2014 (FR) ..................... 14 01226

(51) Int. Cl.
| | | |
|---|---|---|
| *B64D 37/20* | (2006.01) | |
| *B64D 41/00* | (2006.01) | |
| *F02C 7/236* | (2006.01) | |
| *F02C 9/42* | (2006.01) | |
| *B64C 27/12* | (2006.01) | |
| *B64D 37/08* | (2006.01) | |

(52) U.S. Cl.
CPC ............. *B64D 37/20* (2013.01); *B64C 27/12* (2013.01); *B64D 37/08* (2013.01); *B64D 41/00* (2013.01); *F02C 7/236* (2013.01); *F02C 9/42* (2013.01); *Y02T 50/671* (2013.01)

(58) Field of Classification Search
CPC ........ B64D 37/00; B64D 37/02; B64D 37/04; B64D 37/06; B64D 37/20; B64D 41/00; F02C 7/22; F02C 7/236; F02C 9/26; F02C 9/42; F05D 2220/50
See application file for complete search history.

(56) References Cited

U.S. PATENT DOCUMENTS 5,321,945 A * 6/1994 Bell .................... F02C 7/22
244/135 C
5,660,358 A * 8/1997 Grafwallner ........... B64D 37/14
137/565.17

(Continued)

FOREIGN PATENT DOCUMENTS

| CA | 2831706 | 5/2014 |
|---|---|---|
| EP | 2524871 | 11/2012 |

(Continued)

OTHER PUBLICATIONS

French Search Report for French Application No. 1401226, Completed by the French Patent Office on Jan. 15, 2015, 8 Pages.

*Primary Examiner* — Joseph W Sanderson
(74) *Attorney, Agent, or Firm* — Brooks Kushman P.C.

(57) ABSTRACT

A twin-engined rotorcraft having an installation for feeding fuel to fuel-burning engines of a power plant of the rotorcraft, the engines including main engines suitable individually for driving at least one rotor of the rotorcraft while in flight, and an auxiliary power unit mechanically connected to the rotor while nevertheless being unsuitable on its own for driving it in flight. The auxiliary power unit is fed with fuel by auxiliary pumps drawing fuel from each of main fuel tanks from which the main engines are respectively fed with fuel.

8 Claims, 2 Drawing Sheets

(56) References Cited

U.S. PATENT DOCUMENTS

| | | | |
|---|---|---|---|
| 8,881,764 B2* | 11/2014 | Smith | B64D 37/04 |
| | | | 123/509 |
| 8,966,904 B2 | 3/2015 | Lollini et al. | |
| 9,340,296 B2* | 5/2016 | Loison | B64D 37/08 |
| 9,387,934 B2* | 7/2016 | Gomez | B64D 31/06 |
| 2012/0111417 A1* | 5/2012 | Smith | B64D 37/04 |
| | | | 137/14 |
| 2012/0292908 A1 | 11/2012 | Loison | |
| 2013/0213044 A1* | 8/2013 | Lollini | F02C 7/22 |
| | | | 60/734 |
| 2014/0145028 A1* | 5/2014 | Gomez | B64C 27/12 |
| | | | 244/58 |

FOREIGN PATENT DOCUMENTS

| | | | | |
|---|---|---|---|---|
| EP | 2567896 | | 3/2013 | |
| EP | 2949578 A1 * | 12/2015 | | B64C 27/12 |

\* cited by examiner

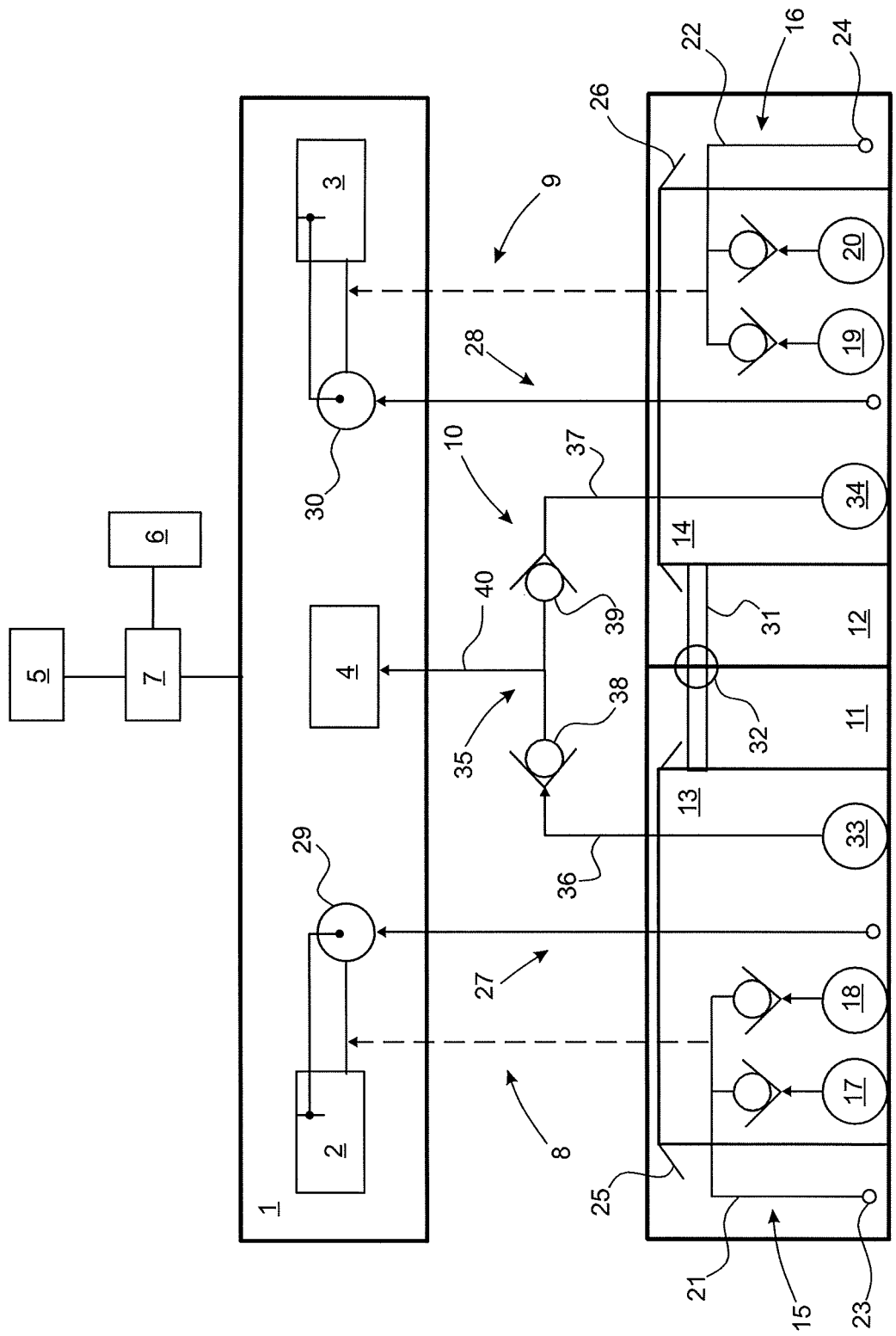

TWIN-ENGINED ROTORCRAFT HAVING A FUEL SUPPLY INSTALLATION FOR A POWER PLANT AUXILIARY POWER UNIT (APU)

CROSS REFERENCE TO RELATED APPLICATION

This application claims priority to French patent application No. FR 14 01226 filed on May 28, 2014, the disclosure of which is incorporated in its entirety by reference herein.

BACKGROUND OF THE INVENTION (1) Field of the Invention

The present invention lies in the field of rotorcraft and it relates more particularly to ways of supplying fuel to a power plant of the rotorcraft.

The present invention relates to an architecture for supplying fuel to a multi-engined power plant of a rotorcraft that supplies mechanical power at least for driving at least one rotor of the rotorcraft.

(2) Description of Related Art

Rotorcraft are rotary wing aircraft having one or more rotors providing the rotorcraft at least with lift, and possibly also with propulsion and/or guidance in flight. Rotorcraft are also provided with various auxiliary members that consume mechanical power, such as compressors, electricity generators, and/or a ventilation, heating, and/or air conditioning installation, for example.

In this context, rotorcraft have a power plant comprising one or more fuel-burning engines, in particular turboshaft engines, comprising one or more main engines and also an auxiliary engine, commonly referred to as an auxiliary power unit (APU). Such rotorcraft are described in particular by the Applicant in Document CA 2 831 706 A1.

The main engines are typically dimensioned to deliver the mechanical power needed for driving the various members of the rotorcraft that consume mechanical power in flight, and in particular the rotor(s) and said auxiliary members. To this end, at least the main engines are engaged with a mechanical power transmission train from which the various members of the rotorcraft that consume mechanical power are driven.

The auxiliary power unit is typically dimensioned to deliver the mechanical power needed for driving the auxiliary members while the rotorcraft is on the ground. For this purpose, the auxiliary power unit is engaged with the mechanical power transmission train while usually being excluded from being engaged mechanically with the rotor(s) of the rotorcraft, given that its use is conventionally reserved for driving auxiliary members when the rotorcraft is not in flight.

In a particular category of rotorcraft, commonly referred to as "category A", the power plant has a plurality of main engines acting simultaneously to provide the mechanical power needed by the rotorcraft in flight. Rotorcraft of category A are allowed to overfly sensitive territories, providing at least one main engine has the ability on its own to supply the mechanical power needed by the rotorcraft in flight in the event of a failure of one of the main engines of the power plant.

In this context, a category A rotorcraft is authorized to overfly a sensitive territory providing that the means that enable the main engines to operate individually on their own are separate. In the event of a failure of one of the main engines because its operation is faulty, at least one other main engine must be capable of driving said at least one rotor without its own operation being hampered by the failure of the faulty main engine.

This applies in particular to the ways in which fuel are supplied to the various main engines of the power plant. For this purpose, category A rotorcraft are typically provided with an installation for supplying fuel to the power plant that combines a plurality of fuel supply assemblies that are respectively allocated to feeding fuel individually to the various main engines.

Conventionally, the various fuel feed assemblies are isolated from one another in fluid flow terms. Each fuel feed assembly typically has a fuel tank, possibly made up of one or more fuel reserves in fluid flow communication with one another, and a fluid flow circuit suitable for conveying fuel from the tank to the associated main engine.

The main engines are conventionally fed individually with fuel via main pumps that are driven by the main engines. More particularly, when considering a given fuel supply assembly, the fluid flow circuit comprises at least one or more pipes and a said main pump driven by the main engine. The main pump sucks fuel from the tank in order to convey it to the main engine via a feed duct of the fluid flow circuit.

In addition, each of the fuel supply assemblies may also have at least one booster pump immersed in the tank for delivering fuel to the main engine in order to initiate its starting.

There arises a problem of fuel tanks possibly running out of fuel, e.g. as a result of fuel leaking from a faulty tank or as a result of the main engine associated with the tank consuming all of the fuel that was initially contained in that tank.

That is why it is common practice for each of the tanks to be provided with a feeder of predefined capacity. For a given fuel assembly, the feeder provides a reserve of fuel that enables the main engine to operate for a determined duration in the event of the tank running out of fuel.

The feeder is conventionally arranged inside the fuel tank and it is fed with fuel by at least one transfer pump. The transfer pump(s) convey(s) fuel continuously from the tank to the feeder, and the feeder has an overflow for returning excess fuel to the tank.

These provisions are such that the feeder is kept full of fuel providing fuel remains within the tank. In the event of the tank running out of fuel, the main engine can continue to operate for a duration that is predetermined by the capacity of the feeder.

Where appropriate, and in order to reduce the number of fluid flow members used by the fuel supply installation, the transfer pump(s) of a given fuel supply assembly may also be used to form said booster pump.

It is also common practice to provide a cross-feed circuit between the various tanks of the fuel supply installation in order to enable fuel to be exchanged between the tanks, in particular for the purpose of balancing the distribution of the weight of the fuel on board the rotorcraft. Providing a fluid flow member incorporated in the cross-feed circuit is activated, fuel from one tank can be used for maintaining an available quantity of fuel in another tank, or at least in the feeder associated with that other tank.

For information about a technological environment close to the present invention, reference may be made for example to Document EP 2 567 896 (Eurocopter), which describes a fuel supply installation for a twin-engined rotorcraft. Nevertheless, in that document, nothing states nor suggests using an auxiliary power unit in addition to the two main engines for driving a main rotor. Such a document therefore does not describe supplying fuel to such an auxiliary power unit.

In general manner, it is always desirable to simplify the organization of equipment on board rotorcraft, in particular in order to reduce the cost associated with designing, installing, and maintaining such equipment, and also for the purpose of reducing the overall weight of rotorcraft.

Such a search for simplification applies, amongst other things, to installations for supplying fuel to a power plant of a rotorcraft, as mentioned in Document EP 2 567 896.

Nevertheless, such a search for simplification must comply with flying safety constraints on category A multi-engined rotorcraft, in particular in the event of one of the tanks running out of fuel and/or in the event of one of the main engines failing.

Concerning the auxiliary power unit, it may have an auxiliary assembly for feeding it with fuel, which assembly may be of simplified architecture, given that its function is conventionally reserved to driving auxiliary members while the rotorcraft is on the ground. Such a simplified architecture for the auxiliary fuel supply assembly makes it possible in particular to use a single auxiliary fuel supply pump for the auxiliary power unit and taking fuel from a fuel tank that is specifically reserved for feeding fuel to the auxiliary power unit, or else from one of the tanks for feeding fuel to a main engine.

It may nevertheless be most advantageous also to make use of the auxiliary power unit in flight for the purpose of contributing to driving the rotor(s) of the rotorcraft, so as to deliver extra mechanical power under special flying circumstances in which a large amount of mechanical power is required, such as hovering, during takeoff or landing, or indeed in the event of one of the main engines failing, for example.

Nevertheless, under such circumstances, the auxiliary power unit remains mechanically engaged with the main power transmission train in order to contribute to driving the rotor(s) of the rotorcraft, even if its contribution is small. In such a context and given the specific constraints on category A rotorcraft, the auxiliary power unit must be capable of operating independently in the event of one of the main engines failing, in particular concerning the way in which the auxiliary power unit is supplied with fuel.

Furthermore, as described in Document EP 2 524 871 A1, it is also known to provide an aircraft with two main engines and an auxiliary power unit. Such an aircraft also has main tanks for feeding the two main engines with fuel. The auxiliary power unit is fed with fuel from an auxiliary tank housed inside one of the main tanks.

Nevertheless, under such circumstances, the main tanks do not have feeders. Furthermore, the auxiliary pump(s) for feeding the auxiliary power unit with fuel is/are housed in only one of the main tanks.

In this context, it is desirable to seek a solution for installing an assembly for supplying fuel that is reserved for the auxiliary power unit, while also coming within the above-mentioned search for simplifying the fuel feed architecture for the power plant, and while complying with the constraints associated with supplying fuel to the engines of a category A multi-engined rotorcraft that are mechanically engaged with the rotor(s) of the rotorcraft.

The present invention thus lies in the context of searching for such a solution on the basis of the above observation from which the approach of the present invention stems.

In the context of the auxiliary power unit possibly participating in providing some of the drive for the rotor(s) of the rotorcraft, conventional prejudices in the field of aviation need to be overcome in order to provide viable and safe ways of supplying fuel to the auxiliary power unit, while avoiding as much as possible adding complexity to the architecture of the installation for supplying fuel to the power plant.

It is found in practice that such prejudices go against using the auxiliary power unit for providing any participation in the driving of the rotor(s) of a category A multi-engined rotorcraft because of the extra complexity that arises in the architecture for feeding fuel to the power plant.

The difficulty of such an approach is to be seen in particular when said multi-engined rotorcraft is a twin-engined rotorcraft, i.e. a rotorcraft having a power plant with two of said main fuel-burning engines each of dimensions suitable for individually driving the rotor(s) of the rotorcraft in flight in the event of a failure of one of the main engines.

In such a context, in the event of one of the main engines failing, only one main engine is available for providing the mechanical power needed to keep the rotorcraft in flight under safe flying conditions, since the auxiliary power unit is incapable on its own of providing the drive required by the rotor(s) of the rotorcraft.

BRIEF SUMMARY OF THE INVENTION

An object of the present invention is to provide such a twin-engined rotorcraft of category A in which the power plant has two said fuel-burning main engines and at least one said auxiliary power unit, as defined above.

More specifically, an object of the present invention is to provide such a twin-engined rotorcraft of category A that has an installation for feeding fuel to the fuel-burning engines of the power plant.

The organization of said installation of the present invention for supplying fuel needs to be viable under safe flying conditions for the rotorcraft in the event of one of the main engines failing, in a context of simplifying the way in which fuel is supplied to the auxiliary power unit. Account needs to be taken in particular of the constraints that apply to category A rotorcraft, while also taking account of the auxiliary power unit participating in providing a small and/or temporary additional amount of mechanical power during specific stages of flight of the rotorcraft for the purpose of driving the rotor(s) of the rotorcraft.

The rotorcraft of the present invention is a twin-engined rotorcraft having a fuel supply installation for supplying fuel to fuel-burning engines of a power plant of the rotorcraft. Said power plant supplies mechanical power that is used for driving mechanical power consuming members of the rotorcraft via a mechanical power drive train.

Said mechanical power consuming members comprise at least one rotor, including at least one main rotor providing the rotorcraft at least with lift. Said mechanical power consuming members also comprise auxiliary members excluding any such rotor of the rotorcraft and contributing either in isolation or in combination to providing the rotorcraft with lift, propulsion, and/or guidance.

The power plant also comprises two main fuel-burning engines of individual dimensions enabling each of the main engines to drive individually said at least one rotor for a predefined duration in the event of one of the main engines failing.

The power plant includes at least one fuel-burning auxiliary power unit of dimensions that enable the auxiliary power unit to drive said auxiliary members but do not enable it on its own to drive said at least one rotor while the rotorcraft is in flight.

Furthermore, the fuel supply installation comprises main fuel supply assemblies that are distinct from each other. Such distinct main fuel supply assemblies are associated with respective ones of the main engines in order to supply them individually with fuel.

Each main fuel supply assembly comprises at least a single main fuel tank and a main fluid flow circuit. The main fluid flow circuit comprises at least one main pump and is a circuit for conveying fuel from a main feeder of the main tank towards the main engine with which the main fuel supply assembly under consideration is associated.

In a preferred embodiment, the main pump of a main fluid flow circuit under consideration is in particular conventionally driven by the main engine that is fed with fuel by said main fluid flow circuit under consideration.

Each main fuel supply assembly also includes a main fuel transfer circuit comprising in particular at least one main transfer pump. The main transfer circuit is a circuit for conveying fuel from the main tank to the main feeder. In this context, and as is conventional, the main feeder is provided with an overflow for returning excess fuel to the main tank.

Furthermore, the fuel supply installation has an auxiliary fuel supply assembly with an auxiliary fluid flow circuit. The auxiliary fluid flow circuit has at least one auxiliary pump and is a circuit for conveying fuel from the two main tanks to the auxiliary power unit.

In this context, and in accordance with the approach of the present invention, the auxiliary power unit is used to contribute to driving said at least one rotor, it being understood that the auxiliary power unit is incapable on its own of providing the drive needed by said at least one rotor while the rotorcraft is in flight.

In the context of this approach, the present invention proposes feeding the auxiliary power unit with fuel from either of the main tanks. In the event of either one of the main tanks running out of fuel, the auxiliary power unit can continue to be fed with fuel from the other main tank.

Consequently, having the auxiliary power unit mechanically engaged with the drive train for driving the rotor(s) of the rotorcraft is viable, while also complying with safe flying conditions in the event of one of the main tanks running out of fuel, and this is achieved without making the fuel supply installation of the power plant of the rotorcraft more complex in a manner that is economically unacceptable.

More particularly in accordance with the present invention, each of the main tanks houses a said auxiliary pump, the auxiliary fluid flow circuit being a circuit for conveying fuel to the auxiliary power unit from either one of the main tanks via an auxiliary duct in fluid flow communication jointly with each of the auxiliary pumps respectively housed in the main tanks.

The main tanks are shared so that together they form two distinct reserves of fuel, each capable individually of feeding fuel to the auxiliary power unit via the auxiliary fluid flow circuit. In the event of either one of the main tanks running out of fuel and causing the main engine supplied with fuel from that empty main tank to fail, the auxiliary power unit continues to be supplied with fuel from the other main tank.

The architecture of the auxiliary supply assembly is simplified by not having a fuel tank specific to the auxiliary power unit, while still being suitable for maintaining a supply of fuel to the auxiliary power unit in the event of fuel running out in one of the main tanks, and while still complying with safe flying conditions for the rotorcraft, and possibly indeed optimizing such safe flying conditions in the event of one of the main engines failing by supplying additional mechanical power from the auxiliary power unit, in particular for assisting in driving the rotor(s) of the rotorcraft.

In a preferred arrangement of the auxiliary duct, it comprises two upstream auxiliary channels in fluid flow communication respectively with each of the auxiliary pumps. The upstream auxiliary channels are jointly in fluid flow communication with a downstream auxiliary channel, itself in fluid flow communication with the auxiliary power unit.

Naturally, with such an architecture for the auxiliary duct, the concepts of "upstream" and "downstream" are relative concepts considered with reference to the flow direction of fuel through the fluid flow circuit from the auxiliary pump to the auxiliary power unit.

Each of said two auxiliary channels may advantageously be provided with a check valve preventing fluid from passing from either one of the main tanks to the other. Such arrangements and the organization of the auxiliary duct make it possible, using simple structural techniques, reliably to prevent fluid passing from one of the main tanks to the other via the auxiliary fluid flow circuit. Such provisions are useful in particular in the event of one of the main fuel tanks running out of fuel, so as to prevent air passing from the empty main tank to the other main tank and/or to the auxiliary power unit.

Furthermore, and depending on the specific organization of the main fuel supply assemblies, each of the main fluid flow circuits may include such check valves to prevent any such passage of air from the main tank to the main engines that are respectively associated therewith.

In a simple embodiment, the auxiliary pumps are placed in the bottoms of the main tanks respectively associated therewith. Placing auxiliary pumps in this way at the bottoms of the main tanks excludes an auxiliary feeder for supplying fuel to the auxiliary power unit in the equipment constituting the auxiliary fuel supply assembly.

Nevertheless, the possibility of providing the auxiliary fuel supply assembly with feeders having the auxiliary pumps respectively immersed therein should not be excluded. Such provisions enable the auxiliary power unit to operate independently for a predefined duration in the event of one and/or the other of the main tanks running out of fuel. Such a predefined duration may in particular be identical to the predefined duration for which the main engines can run in the event of the main fuel tank associated therewith running out of fuel.

More particularly, in a particular embodiment, the auxiliary pumps are located respectively in the bottoms of the main feeders forming part respectively of each of the main tanks. The respective capacities of each of the main feeders are suitable for enabling fuel to be supplied for a predefined duration both to the auxiliary power unit and to the main engine that is supplied with fuel from the main feeder associated therewith.

It may nevertheless be preferred to limit the individual capacity of each main feeder. Under such circumstances, it is proposed to provide the auxiliary fluid flow circuit with auxiliary feeders associated with respective ones of the auxiliary pumps.

More particularly, in another embodiment, the auxiliary pumps are housed respectively in the bottoms of auxiliary feeders forming part respectively of each of the main tanks Each of the auxiliary feeders is fed with fuel from the main tank respectively receiving it.

The auxiliary feeders are potentially supplied with fuel from the main tanks respectively housing them via respective auxiliary transfer circuits that are distinct from the main transfer circuits.

Each such auxiliary transfer circuit may conventionally use at least one auxiliary transfer pump conveying fuel for a given auxiliary transfer circuit under consideration between the main tank and the auxiliary feeder housed in that main tank. Such an auxiliary transfer pump may, under such circumstances, also advantageously be formed by the auxiliary pump of an auxiliary transfer circuit under consideration.

Nevertheless, when the auxiliary pumps are placed at the bottoms of said auxiliary feeders, and still for the purpose of simplifying the architecture of the installation for feeding fuel to the power plant, it is proposed that the main transfer circuit and the auxiliary transfer circuit drawing fuel from the same main tank should be shared in order to feed jointly the main feeder and the auxiliary feeder housed in the same main tank.

More particularly when the auxiliary pumps are placed in the bottoms of said auxiliary feeders, it is advantageously proposed to supply the auxiliary feeders with fuel from the main tanks respectively housing them via main transfer circuits with which the auxiliary pumps are in fluid flow communication.

BRIEF DESCRIPTION OF THE SEVERAL VIEWS OF THE DRAWINGS

An embodiment of the present invention is described below with reference to the figures of the accompanying sheets, in which FIGS. 1 and 2 are diagrams of a fuel supply installation of a twin-engined rotorcraft in a preferred embodiment of the invention.

DETAILED DESCRIPTION OF THE INVENTION

Figure 1:
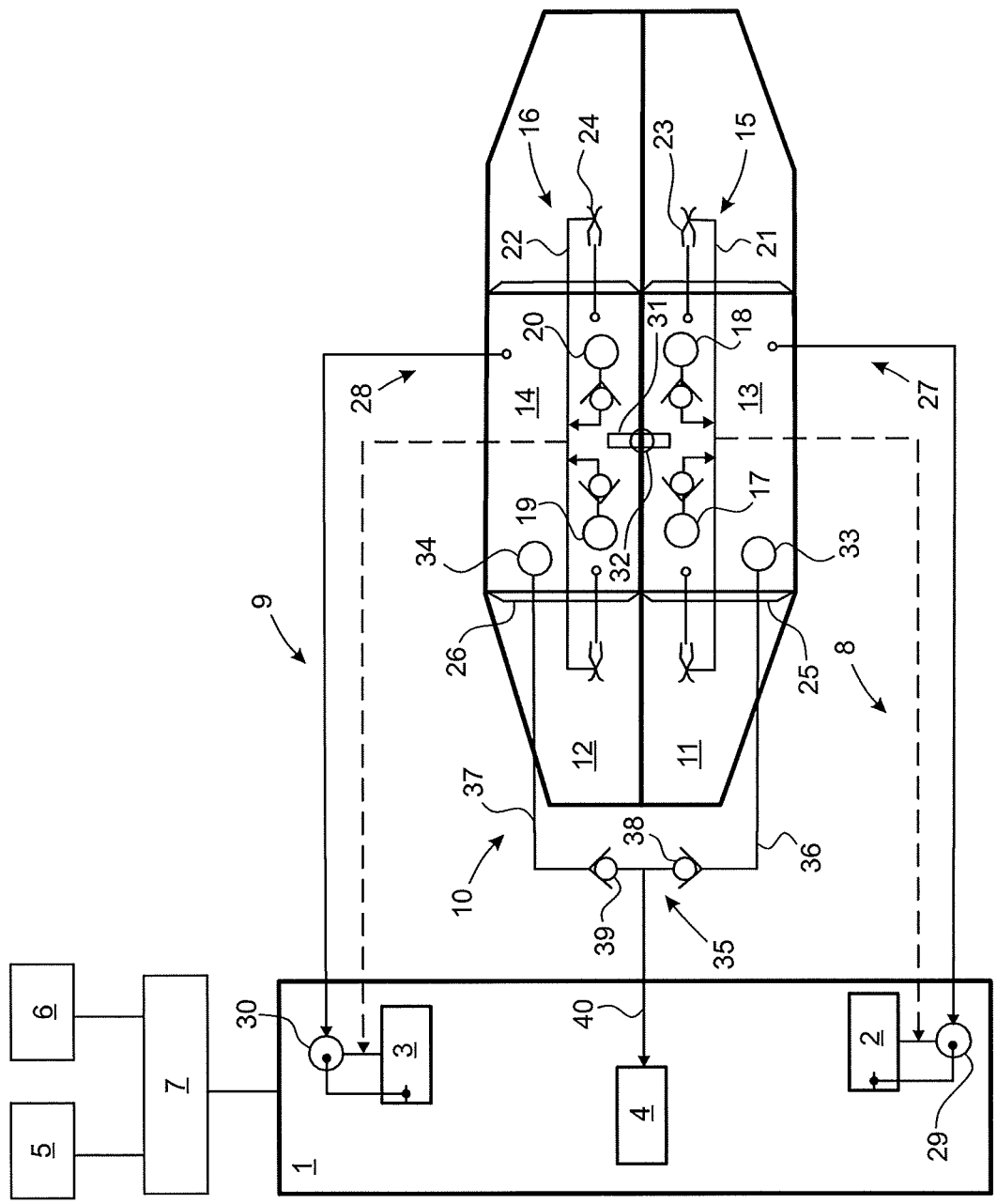

In FIGS. 1 and 2, a twin-engined rotorcraft has a power plant 1 providing the rotorcraft with the mechanical power required for its operation. The power plant 1 has main fuel-burning engines 2 and 3 and an auxiliary fuel-burning power unit 4 that are supplied with fuel by means of a fuel supply installation for the power plant 1.

In the context of a twin-engined rotorcraft, the main engines 2 and 3 are two in number, and typically each of them is designed to be capable on its own of supplying the mechanical power needed for driving at least one rotor 5 of the rotorcraft in flight.

Said rotor 5 is in particular a rotor that is commonly referred to as the "main" rotor that typically provides the rotorcraft at least with lift and possibly also with propulsion and/or guidance in flight in the specific example of a helicopter. Said rotor 5 is potentially also associated with at least one auxiliary rotor providing the rotorcraft with guidance in yaw and possibly also with propulsion in translation for a high-speed helicopter.

The auxiliary power unit 4 is of smaller dimensions than either of the main engines 2 and 3, serving mainly to drive auxiliary members 6 of the rotorcraft that consume mechanical power. Such auxiliary members typically comprise hydraulic units, compressors, one or more electricity generator machines, and/or a ventilation, heating, and/or air conditioning installation, and possibly also services, for example.

In contrast to the main engines 2 and 3, the auxiliary power unit 4 is dimensioned to be capable of producing mechanical power that on its own is insufficient for driving said at least one rotor 5 while the rotorcraft is in flight. Nevertheless, the auxiliary power unit 4 is advantageously used in flight to contribute to driving said at least one rotor 5 by providing extra mechanical power during certain specific stages of flight of the rotorcraft in addition to the mechanical power that is essentially supplied by the main engines 2 and 3.

In this context, the main engines 2 and 3 and the auxiliary power unit 4 are mechanically connected to a main gearbox 7 for mechanical power transmission. The various members 5, 6 of the rotorcraft that consume mechanical power are typically driven from the main gearbox 7 while it is being driven jointly by the main engines 2 and 3 and by the auxiliary power unit 4 during certain stages of flight in which it is necessary to optimize the supply of mechanical power for the rotorcraft.

The fuel supply installation of the power plant 1 comprises a plurality of fuel supply assemblies 8, 9, and 10 comprising main fuel supply assemblies 8 and 9 and an auxiliary fuel supply assembly.

The main fuel supply assemblies 8 and 9 are respectively associated with individually feeding the main engines 2 and 3 with fuel. The auxiliary fuel supply assembly is associated with feeding the auxiliary power unit 4 with fuel.

In conventional manner, each main fuel supply assembly 8 and 9 comprises:

a main fuel tank 11, 12 potentially made up of a plurality of fuel containers placed in fluid flow communication with one another;

a main feeder 13, 14 housed in the main tank 11, 12 and provided with a transfer circuit 15, 16 for transferring fuel from the main tank 11, 12 to the main feeder 13, 14; and a main fluid flow circuit 27, 28 having a main pump 29, 30 drawing fuel from the main feeder 13, 14 in order to supply fuel individually to a respective one of the main engines 2, 3. In the embodiment shown, the main pump 29, 30 is typically driven by the main engine 2, 3 as fed with fuel by the main pump 29, 30.

In the embodiment shown, said transfer circuits typically comprise respectively at least one transfer pump 17, 18; 19, 20 together with a transfer pipe 21, 22 having at least one ejector 23, 24 immersed in the main tank 11, 12. The transfer pumps 17, 18; 19, 20 are preferably two in number and they may potentially be used for forming booster pumps. Conventionally, such booster pumps are used for feeding the main engines 2, 3 in order to initiate starting, until sufficient drive is obtained for the main pumps 29, 30.

Each of the main feeders 13, 14 has an overflow 25, 26 enabling excess fuel to be discharged from the main feeders 13, 14 to the main tanks 11, 12. A cross-feed circuit 31 is preferably provided between the main feeders 13, 14 and each of the main fuel supply assemblies 8, 9 in order to balance the quantities of fuel contained respectively in the main tanks 11 and 12.

Such a cross-feed circuit 31 is typically used selectively by activating a hydraulic regulator member 32 for exchanging fuel between the main tanks 11, 12, and more specifically between the main feeders 13, 14, as shown in the figures. Such a hydraulic regulator member 32 may be controlled depending on requirements, e.g. being constituted by a cross-feed valve or by a cross-feed pump, for example.

In this context, there arises the problem of one of the main tanks 11, 12 or indeed or one of the main feeders 13, 14 possibly running out of fuel. This might possibly occur because of a leak of fuel from a main tank 11, 12 that has become faulty. Conventionally, in the event of a failure and/or a loss of fuel supply to one of the main engines 2, 3, the other main engines 2, 3 then acts on its own to drive said at least one rotor 5 for a predefined duration that itself determines the individual capacity that each of the main feeders 13, 14 must have.

Nevertheless, since the auxiliary power unit 4 is mechanically connected to said at least one rotor 5, the supply of fuel to the auxiliary power unit 4 must be maintained in the event of a failure of either of the main engines 2, 3 and/or in the event of either of the main tanks 11, 12 running out of fuel.

In this context, a solution is proposed that enables the auxiliary power unit 4 to continue to be supplied with fuel, but without that excessively complicating the configuration of the fuel supply installation for the power plant 1 and without that affecting the safety in flight of the rotorcraft in the event of one of the main engines 2, 3 failing.

For this purpose, in the embodiment shown in the figures that is preferred because of its optimization and because of its simple structure, the auxiliary power unit 4 is fed with fuel by means of an auxiliary fluid flow circuit 10 conveying fuel from each of the main feeders 13, 14 to the auxiliary power unit 4. The auxiliary fluid flow circuit 10 has two auxiliary pumps 33 and 34 that are immersed respectively in each of the main feeders 13, 14.

The auxiliary pumps 33, 34 are placed jointly in fluid flow communication with an auxiliary duct 35 conveying fuel from each of the auxiliary pumps 33, 34 to the auxiliary power unit 4. In the event of fuel running out from either of the main tanks 11, 12, the supply of fuel to the auxiliary power unit 4 is maintained from the other main tank 11, 12.

The auxiliary duct 35 includes in particular upstream channels 36, 37 respectively associated with drawing fuel from one or the other of the main tanks 11, 12. Each of the upstream channels 36, 37 has a respective check valve 38, 39 preventing air from passing from either of the empty main tanks 11, 12 to the auxiliary power unit 4 and/or to the other main tank 11, 12. The upstream channels 36, 37 are jointly placed in fluid flow communication with a downstream channel 40 of the auxiliary duct 35, said downstream channel 40 conveying fuel from the upstream channels 36, 37 to the auxiliary power unit 4.

What is claimed is:

1. A twin-engined rotorcraft comprising:
   a power plant;
   a fuel supply installation for supplying fuel to fuel-burning engines of the power plant of the rotorcraft, the power plant supplying mechanical power that is used for driving mechanical power consuming members of the rotorcraft via a mechanical power drive train, the mechanical power consuming members comprising:
   at least one rotor including at least one main rotor providing the rotorcraft at least with lift; and
   auxiliary members, the auxiliary members not including any rotor of the rotorcraft that contributes to providing the rotorcraft with at least one of lift, propulsion, and guidance;
   the power plant comprising:
   two main fuel-burning engines of individual dimensions making the engines suitable for individually driving the at least one rotor for a predefined duration in the event of one of the main engines failing; and
   at least one fuel-burning auxiliary power unit of dimensions enabling the at least one auxiliary power unit to drive the auxiliary members while not enabling the at least one auxiliary power unit alone to drive the at least one rotor while the rotorcraft is in flight;
   wherein the fuel supply installation comprises:
   mutually distinct main fuel supply assemblies allocated respectively to each of the main engines for feeding each of the main engines individually with fuel, each main fuel supply assembly comprising at least:
   a main fuel tank and a main fluid flow circuit including at least one main pump, the main fluid flow circuit being a circuit for conveying fuel from a main feeder within the main tank to the main engine with which the corresponding main fuel supply assembly is associated; and
   a main fuel transfer circuit comprising at least one main transfer pump, the main transfer circuit being a circuit for conveying fuel from the main tank to the main feeder, the main feeder being provided with an overflow returning excess fuel to the main tank; and
   an auxiliary fuel supply assembly having an auxiliary fluid flow circuit with two auxiliary pumps, the auxiliary fluid flow circuit being a circuit for conveying fuel from each of the main tanks of the main fuel supply assemblies to the at least one auxiliary power unit; and
   wherein each main tank houses one of the two auxiliary pumps, the auxiliary fluid flow circuit being a circuit for conveying fuel to the at least one auxiliary power unit from each of the main tanks via an auxiliary duct in fluid flow communication jointly with each of the auxiliary pumps respectively housed in the main tanks.

2. A twin-engined rotorcraft according to claim 1, wherein the auxiliary duct has two upstream auxiliary channels in fluid flow communication respectively with each of the auxiliary pumps, the upstream auxiliary channels being jointly in fluid flow communication with a downstream auxiliary channel, the downstream auxiliary channel being in fluid flow communication with the at least one auxiliary power unit.

3. A twin-engined rotorcraft according to claim 2, wherein each of the two upstream auxiliary channels is provided with a check valve preventing fluid from passing from either one of the main tanks to the other.

4. A twin-engined rotorcraft according to claim 1, wherein the auxiliary pumps are placed in the bottoms of the main tanks respectively associated therewith for supplying fuel to the at least one auxiliary power unit in the equipment constituting the auxiliary fuel supply assembly without the aid of an auxiliary feeder.

5. A twin-engined rotorcraft according to claim 1, wherein the auxiliary pumps are located respectively in the bottoms of the main feeders forming part respectively of each of the main tanks, the respective capacities of the main feeders each being suitable for enabling fuel to be supplied for a predefined duration both to the at least one auxiliary power unit and to the main engine that is supplied with fuel from the main feeder associated therewith.

6. A twin-engined rotorcraft according to claim 1, wherein the auxiliary pumps are housed respectively in the bottoms of auxiliary feeders forming part respectively of each of the main tanks, each of the auxiliary feeders being fed with fuel from the main tank respectively receiving each of the auxiliary feeders.

7. A twin-engined rotorcraft according to claim 6, wherein the auxiliary feeders are supplied with fuel from the main tanks respectively housing the auxiliary feeders via respective auxiliary transfer circuits that are distinct from the main transfer circuits.

8. A twin-engined rotorcraft according to claim 6, wherein the auxiliary feeders are supplied with fuel from the main tanks respectively housing the auxiliary feeders via the main transfer circuits with which the auxiliary pumps are in fluid flow communication.

* * * * *